(12) United States Patent
Hayashi

(10) Patent No.: US 6,694,414 B2
(45) Date of Patent: Feb. 17, 2004

(54) MAGNETIC DISC DEVICE HAVING COPY PROTECT FUNCTION

(75) Inventor: Katsumi Hayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 128 days.

(21) Appl. No.: 09/886,370

(22) Filed: Jun. 22, 2001

(65) Prior Publication Data
US 2002/0004891 A1 Jan. 10, 2002

(30) Foreign Application Priority Data
Jul. 4, 2000 (JP) ........................... 2000-202229

(51) Int. Cl.$^7$ ............... G06F 12/08; G06F 12/14
(52) U.S. Cl. ............... 711/163; 711/164; 711/112
(58) Field of Search ............... 711/112, 163, 711/164; 360/133

(56) References Cited

U.S. PATENT DOCUMENTS 5,623,597 A * 4/1997 Kikinis ............... 713/200
6,025,973 A * 2/2000 Mizoshita et al. ....... 360/98.08
6,247,077 B1 * 6/2001 Muller et al. ............ 710/74
2001/0007120 * 7/2001 Makita ................... 711/112

FOREIGN PATENT DOCUMENTS

| JP | 61-206905 | 9/1986 |
| JP | 63-195801 | 8/1988 |
| JP | 63-204578 | 8/1988 |
| JP | 11-306648 | 11/1999 |
| JP | 11-306673 | 11/1999 |

* cited by examiner

Primary Examiner—Mano Padmanabhan
Assistant Examiner—Midys Inoa
(74) Attorney, Agent, or Firm—McGinn & Gibb, PLLC

(57) ABSTRACT

A magnetic disc device includes a disc enclosure for enclosing a magnetic disc medium on which data has been recorded, and a circuit for processing a signal that has been read from the magnetic disc device, wherein a signal that is read from the magnetic disc is output from only an interface. The device may further include an authentication device which determines whether authentication codes match and/or a device that limits the number of times that a retry procedure may be performed when a data read error occurs.

12 Claims, 3 Drawing Sheets

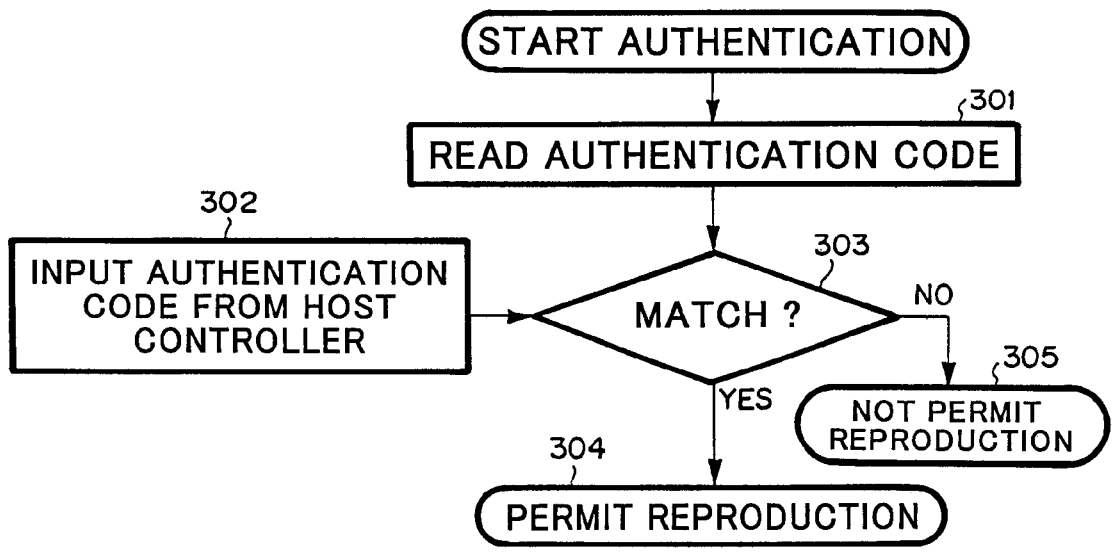
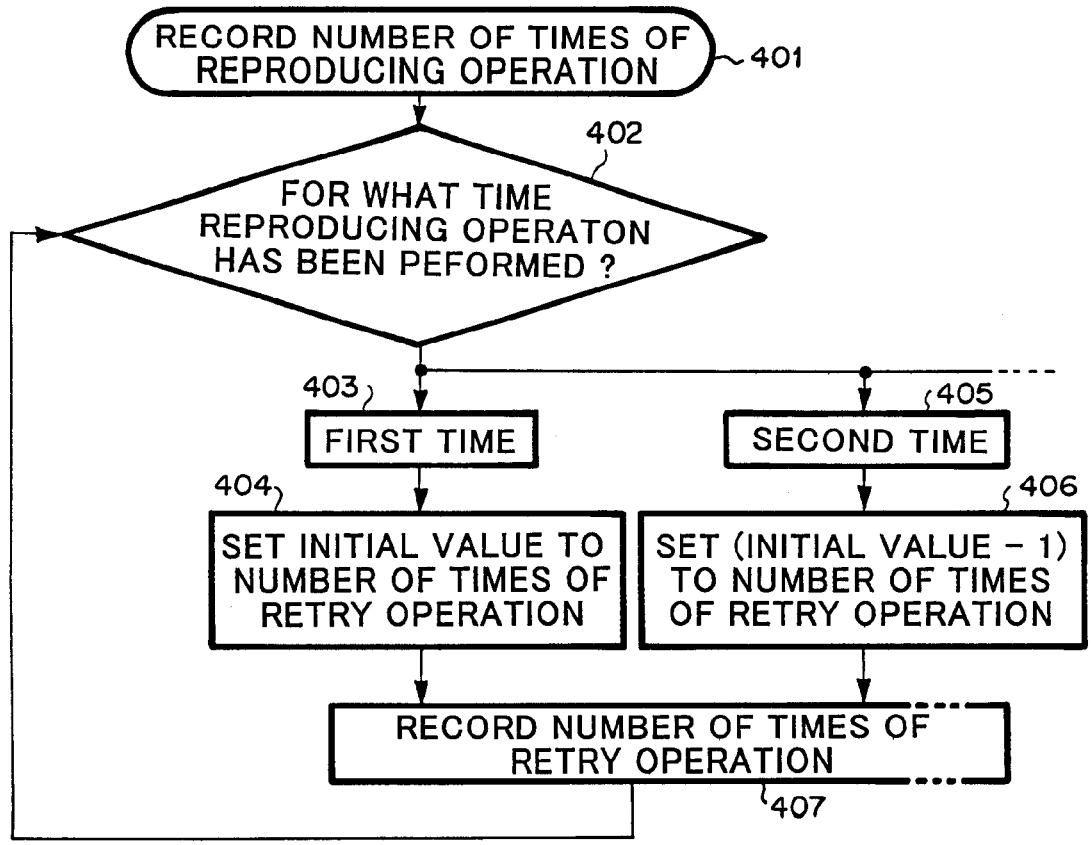

MAGNETIC DISC DEVICE HAVING COPY PROTECT FUNCTION

BACKGROUND OF THE INVENTION

1. Field of the Invention

The present invention relates to a magnetic disc apparatus, and in particular, to improvements of a hardware structure and a circuit structure of a magnetic disc apparatus that accomplishes a copy protect function.

2. Description of the Prior Art

Conventional magnetic discs do not have a copy protect function. The copy protect function is conventionally accomplished as a write protect function using a switch or a jumper disposed on a circuit board. The purpose of the write protect function is to prevent user data from being mistakenly destroyed with data that is written when it is restored from a magnetic disc that is defective. On the other hand, digital high quality data tends to be stored to a magnetic disc.

Digital high quality video data such as movies and video clips can be copied without a deterioration of the picture quality. Thus, from a view point of the copyright protection of digital contents, needs for copy-protecting digital high quality pictures are becoming strong To satisfy such needs, for example JPA 11-306648 (referred to as related art reference 1) discloses an information record medium having a copy protect function. According to the technology disclosed in the related art reference 1, an information record area for recording predetermined information and a trap area for causing a copying device to malfunction are formed so as to prevent all information including encrypted information recoded on an optical disc from being copied as it is.

In addition, JPA 61-206905 (referred to as related art reference No. 2) discloses a magnetic disc having a copy protect code. The magnetic disc of the related art reference 2 comprises (1) a magnetic disc device of which a magnetic disc is used as a record medium, (2) a magnetic disc device controlling circuit for generating a random number and recording the generated random number to the magnetic disc, and (3) a host system of which a magnetic disc device is used as a recording device. The magnetic disc has (1-1) an area for recording information received from a host system (this area is referred to as information area) and (1-2) an area for recording random number generated by the magnetic disc device controlling circuit (this area is referred to as random number area). When the host system records information to the information area of the magnetic disc, the magnetic disc device controlling circuit records a random number to the random number area while the host system records information to the information area of the magnetic disc. After they have been recorded, the random number that has been recorded in the random number area is read. The random number is recorded to a particular information area (second information area) different from the information area. When the information area is read from the magnetic disc, the random area is also read The relation between the random number recorded in the second information area and the random number that is read therefrom is verified.

However, in the technology of the related art reference 1, the trap area is formed at a particular position in such a manner that when an RF copy (disc copy) is attempted, the trap area prevents the disc copy from being performed. Thus, the technology of the related art reference 1 is limited to an optical disc of which data is spirally written. Consequently, the related art reference 1 cannot be applied to a magnetic disc of which tracks are recorded on concentric circles (namely, a hard disc drive).

In addition, according to the technology of the related art reference 1, although a copy operation using disc copy command can be prohibited, when data is read using read command and then the read data is written to a destination record medium, the data can be easily copied.

The technology of the related art referenced 2 is applied to a magnetic disc using servo-surface servo-system as a head aligning system for a magnetic disc. Thus, the technology of the related art reference 2 cannot be applied to a magnetic disc using the data-surface servo-system that has been widely used.

In addition, according to the technology of the related art reference 2, a check program for checking a protect code is recorded in a data area along with data. In this method, when data is read from a source magnetic disc sector by sector, rather than a file system level managed by the OS, and then the read data is written to a destination record medium, the data can be easily copied.

SUMMARY OF THE INVENTION

An object of the present invention is to provide a magnetic disc having a hardware structure and a circuit structure that accomplish a copy protect function.

According to a first aspect of the present invention, there is provided a magnetic disc device having a disc enclosure for enclosing: a magnetic disc medium on which data has been recorded; a circuit for processing a signal that has been read from the magnetic disc device, wherein a signal that is read from the magnetic disc is output from only an interface.

The magnetic disc device according to the first aspect may further comprise: a record medium on which a first authentication code has been recorded; an interface for inputting a second authentication code; collating means for collating the first authentication code with the second authentication code; and means for reading the data and outputting the read data to the outside only when the first authentication code matches the second authentication code.

The magnetic disc device according to the first aspect may further comprise: means for decreasing the number of times of a retry operation performed when a data read error takes whenever data is read from the magnetic disc medium.

The magnetic disc device according to the first aspect may further comprise: means for limiting the number of times that data is read from the magnetic disc medium.

According to a second aspect of the present invention, there is provided a magnetic disc medium on which data has been recorded, comprising: a record medium on which a first authentication code has been recorded; an interface for inputting a second authentication code; collating means for collating the first authentication code with the second authentication code; means for reading the data and outputting the read data to the outside only when the first authentication code matches the second authentication code.

According to a third aspect of the present invention, there is provided a magnetic disc device, comprising: a magnetic disc medium on which data has been recorded; and means for decreasing the number of times of a retry operation performed when a data read error takes place whenever the data is read from the magnetic disc medium.

According to a fourth aspect of the present invention, there is provided a magnetic disc device, comprising: a magnetic disc medium on which data has been recorded; and means for limiting the number of times that data is read from the magnetic disc medium.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 2 is a flow chart showing a collating operation of authentication code according to the embodiment of the present invention;

FIG. 3 is a flow chart showing an operation for decrementing the number of times of a retry operation as the number of times of a reproducing operation increases according to the embodiment of the present invention.

DESCRIPTION OF PREFERRED EMBODIMENTS

Next, with reference to the accompanying drawings, embodiments of the present invention will be described in detail.

A magnetic disc device according to the present invention is inserted into a reproducing device such as a docking station connected to a television set. Digital video data as contents such as movies have been recorded on the magnetic disc device. The magnetic disc device and the reproducing device are electrically connected with an interface corresponding to the IEEE 1394 standard. The digital video data is transferred from the magnetic disc device to the reproducing device through the interface. After the digital video data is decoded by the reproducing device, the decoded video data is transferred to the television set A business-use dedicated recording device disposed in for example a rental shop records digital video data as contents to the magnetic disc. After the video data is recorded to the magnetic disc, it is rented to a user. The user reproduces the contents with the reproducing device and watches them with the television set.

The magnetic disc according to the present invention prevents contents recorded thereon from being illegally copied.

Figure 1:
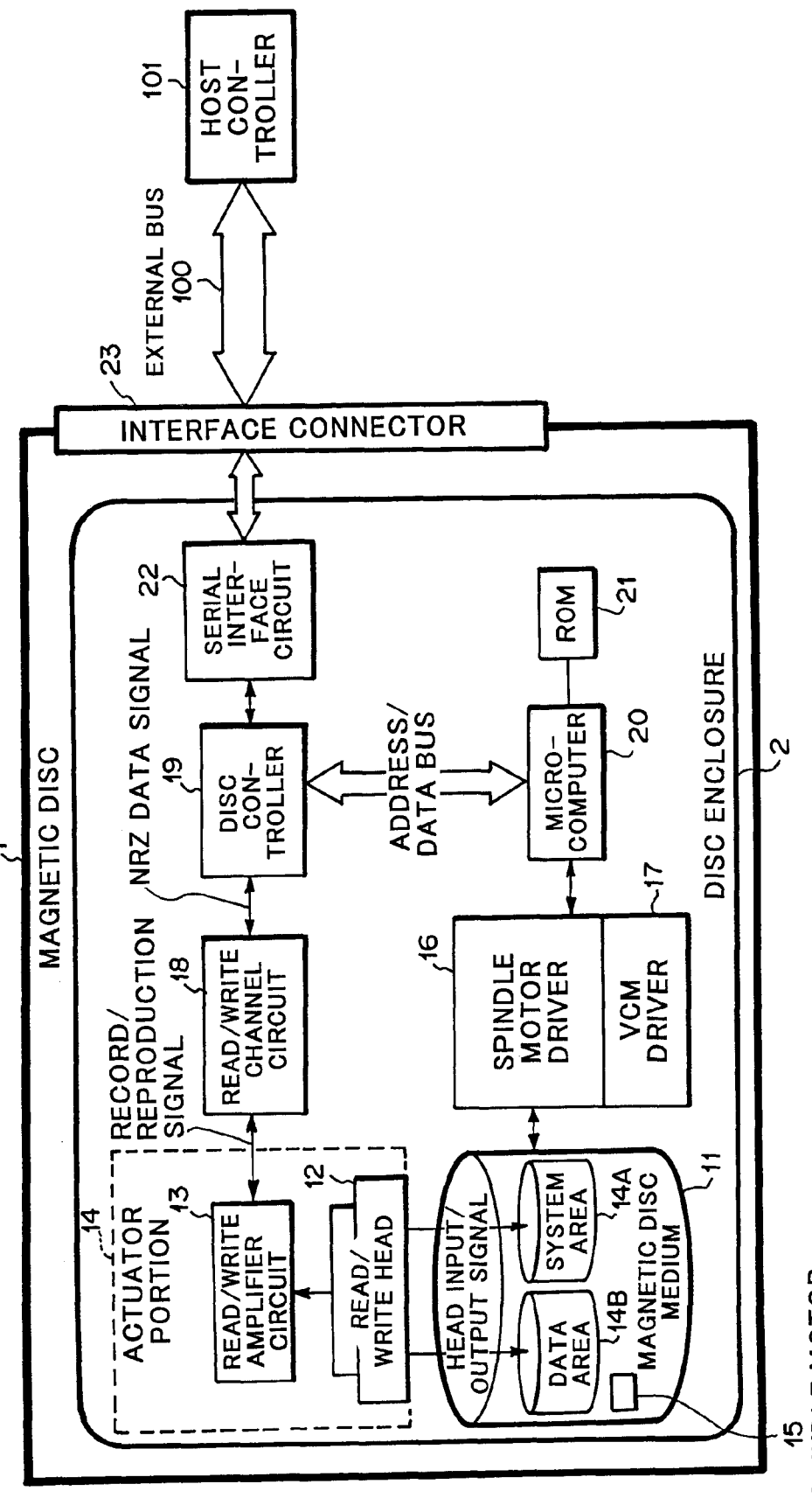
FIG. 1 is a schematic diagram showing the concept of a magnetic disc according to an embodiment of the present invention.

FIG. 1 shows the structure of a magnetic disc 1 according to an embodiment of the present invention. The magnetic disc 1 comprises a disc enclosure 2, a magnetic disc medium 11, an actuator portion 14, a spindle motor 15, a spindle motor driver 16, a VCM driver 17, a read/write channel circuit 18, a disc controller 19, a microcomputer 20, a ROM 21, and a serial interface 22. The disc enclosure 2 encloses those structural devices. The actuator portion 14 has a read/write head 12 and a read/write amplifier circuit 13. In addition, an interface connector 23 is disposed outside the disc enclosure 2.

The read/write head 12 records data that is input from the read/write amplifier circuit 13 to a data area 14B or a system area 14A of the magnetic disc medium 11. The read/write head 12 outputs data that is read from the magnetic disc medium 11 to the read/write amplifier circuit 13. The read/write amplifier circuit 13 equalizes and amplifies the data that is input from the read/write channel circuit 18 and output the amplified data to the read/write head 12. In addition, the read/write amplifier circuit 13 equalizes and amplifies the data that is read by the read/write head 12. The read/write channel circuit 18 modulates data that is input from the disc controller 19 and outputs the modulated data to the read/write amplifier circuit 13. In addition, the read/write channel circuit 18 demodulates data that is input from the read/write amplifier circuit 13 and outputs the demodulated data to the disc controller 19. The disc controller 19 controls the interface corresponding to ATA (AT Attachment) or SCSI (Small Computer System Interface). In addition, the disc controller 19 manages sectors of the magnetic disc medium 11. The serial interface 22 controls an interface such as IEEE 1394 or USB (Universal Serial Bus). The ROM 21 stores a program as a memory with which the microcomputer 20 collates authentication code (that will be described later).

The disc enclosure 2 is not affected by dust, gas, and so forth unless it is opened.

When the interface for use corresponds to THE IEEE 1394 standard, encrypted digital video data is supplied to the serial interface 22 through the interface connector 23 The serial interface 22 decrypts the digital video data. The decrypted digital video data is input to the disc controller 19. The decrypted digital video data is supplied to the read/write head 12 through the read/write channel circuit 18 and the read/write amplifier circuit 13. The read/write head 12 recodes the decrypted digital video data to the data area 14B of the magnetic disc medium 11.

When a read command is input from a host controller 101 through the interface connector 23, the video data is read from the data area 14B of the read/write head 12 in the disc enclosure 2 by the read/write head 12. The video data is supplied to the serial interface 22 through the read/write amplifier circuit 13, the read/write channel circuit 18, and the disc controller 19. The serial interface 22 encrypts the video data. The encrypted video data is output from the interface connector 23.

FIG. 2 shows an operation of the microcomputer 20 controlled by an authentication program stored in the ROM 21.

Authentication code is pre-written to a storage area that can be accessed by the microcomputer 20 and that cannot be used by the user. The authentication code is pre-written to for example the system area 14A of the magnetic disc medium 11 or a non-volatile memory (not shown).

When the microcomputer 20 is controlled by the authentication program, the microcomputer 20 authenticates with the host controller 101. Only when they have been successfully authenticated between them, the microcomputer 20 can read and write digital video data as contents.

Next, with reference to FIG. 2, the operation of the embodiment will be described. In this example, it is assumed that an external bus 100 corresponds to the IEEE 1394 standard.

When the power of the magnetic disc 1 is turned on, the authentication code is read from the system area 14A (at step 301). Thereafter, the encrypted authentication code is input from the host controller 101 through the external bus 100. The serial interface circuit 22 decrypts the encrypted authentication code and outputs the decrypted authentication code to the disc controller 19 (at step 302). The microcomputer 20 collates the authentication code that is read from the system area 14A with the decrypted authentication code (at step 303). When they match at step 303, a read command or a write command is accepted (at step 304). When they do not match, a read command and a write command are not accepted.

The operation for causing the picture quality to be deteriorated corresponding to the number of times of the reproducing operation is performed corresponding to a flow chart shown in FIG. 3. This operation is performed by executing a control program stored in the ROM 21 by the microcomputer 20. While digital video data as contents is being written to the data area 14B of the magnetic disc medium 11, the number of times of the retry operation is initialized (at step 401). When digital video data is reproduced, it is determined for what time the retry operation has been performed (at step 402). When the retry operation is performed first time (at step S403), the retry operation against error is performed a maximum number of times that has been set in the initialization (at step 404). When the video data is reproduced at second time (at step 405), the retry operation against error is executed for (maximum number of times–1) (at step 406). When the video data is reproduced at n-th time, the maximum number of times of the retry operation is decremented by (n–1). After the video data is reproduced, the number of times of the reproducing operation is incremented and recorded to a predetermined record area (for example, the system area 14A) (at step 407).

The number of times of the retry operation may be identification code. Alternatively, the reproducing operation may be restricted. When a magnetic disc that can be reproduced up to two times is required, after the reproducing operation is completed second time (at step 407), reproduction prohibition code is recorded. When the reproducing operation is performed next time, if it is determined whether or not the reproduction prohibition code has been recorded at step 402, the reproducing operation is not performed.

Thus, as the number of times of the reproducing operation is increased, the number of times of the retry operation is decremented. As a result, the same effect as the deterioration of the picture quality corresponding to the increase of the number of times of the reproducing operation for video data of an analog VCR can be achieved. In addition, after the reproducing operation is performed for a predetermined number of times, a strong copy protect function can be accomplished.

Figure 4:
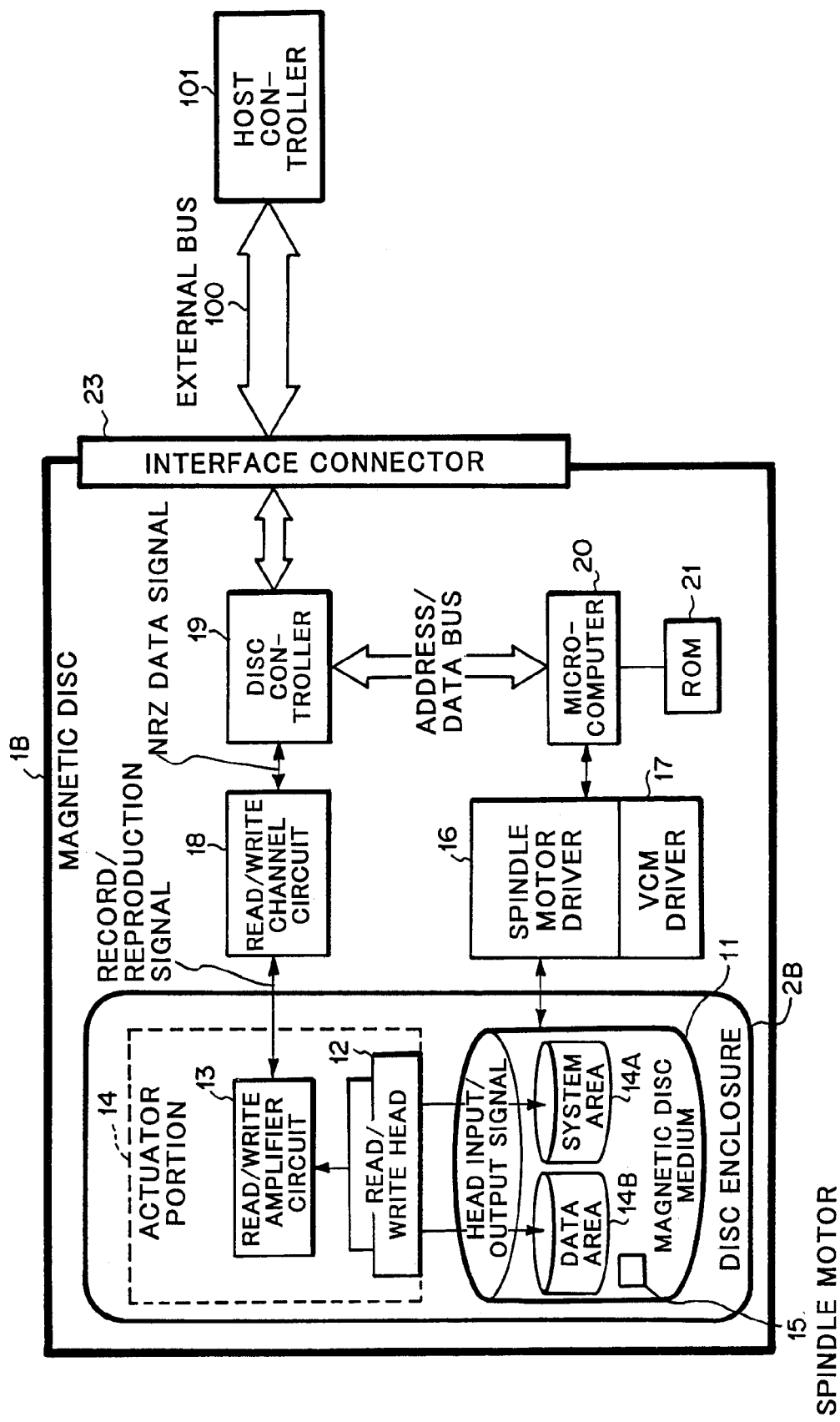
FIG. 4 is a schematic diagram showing the structure of a magnetic disc device according to another embodiment of the present invention.

The operation corresponding to the flow charts shown in FIGS. 2 and 3 can be accomplished by a conventional magnetic disc 1B shown in FIG. 4. In the magnetic disc 1B shown in FIG. 4, only a magnetic disc medium 11, a read/write head 12, and a read/write amplifier circuit 13 are enclosed in the disc enclosure 2. In other words, a spindle motor driver 16, a VCM driver 17, a read/write channel circuit 18, a disc controller 19, a microcomputer 20, and a ROM 21 are not enclosed in the disc enclosure 2B.

As was described above, according to the present invention, since all the magnetic disc medium on which data is recorded and the circuit that processes a signal that is read from the magnetic disc medium area enclosed, a hacker cannot connect a probe to the circuit. Thus, the signal can be prevented from being illegally read and copied. If he or she opens the enclosure and connects a probe to the circuit, the magnetic disc and the read/write head are exposed to dust and gas. Thus, since a read error takes place, data cannot be correctly read.

In addition, according to the present invention, only when the authentication code recorded in the magnetic disc device is matched with the authentication code that is input from the outside, data is read and output to the outside. Thus, only the reproducing device that supplies valid authentication code from the outside to the magnetic disc device can reproduce data. Consequently, only a user who has such a reproducing device can reproduce data. Thus, users who do no have such reproducing devices can not reproduce data. As a result, data can be prevented from being illegally copied.

In addition, according to the present invention, whenever the reproducing operation is performed, the maximum number of times of the retry operation against error is decremented. Thus, when the copy operation is performed a plurality of times, the error rate of the reproduced data increases, thereby deteriorating the quality of the copied data. As a result, many copies can be prevented from being created.

In addition, according to the present invention, since the number of times of the reproducing operation is limited, many copies can be prevented from being created.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A magnetic disc device comprising:

a magnetic disc medium on which data has been recorded;

a circuit for processing a signal that has been read from the magnetic disc device;

a disc enclosure for enclosing said magnetic disc medium and said circuit; and a Read Only Memory (ROM) enclosed by said disc enclosure.

2. The magnetic disc device as set forth in claim 1, further comprising:

a record medium on which a first authentication code has been recorded;

comparing means for the first authentication code with a second authentication code input from said interface; and means for reading the data and outputting the read data to the outside of said disc enclosure only when the first authentication code matches the second authentication code, wherein said disc enclosure further encloses said record medium, said comparing means and said means for reading.

3. The magnetic disc device as set forth in claim 1, further comprising:

means for decreasing the number of times of a retry operation may be performed when a data read error takes place whenever data is read from the magnetic disc medium, wherein said disc enclosure further encloses said means for decreasing.

4. The magnetic disc device as set forth in claim 1, further comprising:

means for limiting the number of times that data is read from said magnetic disc medium, wherein said disc enclosure further encloses said means for limiting.

5. The magnetic disc device of claim 1, further comprising an interface enclosed by said disc enclosure, wherein said interface decrypts a signal being supplied to said magnetic disc medium.

6. The magnetic disc device of claim 1, further comprising an interface enclosed by said disc enclosure, wherein said interface encrypts said signal before outputting said signal.

7. The magnetic disc device of claim 1, further comprising a spindle motor driver connected to said magnetic disc medium and enclosed by said disc enclosure.

8. The magnetic disc device of claim 1, wherein said circuit for processing a signal comprises:

a read/write head for reading information stored on, and writing information to said magnetic disc medium;

a read/write amplifier circuit in communication with said read/write head; and a read/write channel circuit in communication with said read/write amplifier circuit; and a disc controller in communication with said read/write channel circuit.

9. The magnetic disc device of claim 1, further comprising a spindle motor driver enclosed by said disc enclosure.

10. The magnetic disc device of claim 1, further comprising a read/write channel circuit enclosed by said disc enclosure.

11. The magnetic disc device of claim 1, further comprising a disc controller enclosed by said disc enclosure.

12. The magnetic disc device of claim 1, further comprising a microcomputer enclosed by said disc enclosure.

* * * * *